US012339620B2

(12) United States Patent
Imura et al.

(10) Patent No.: US 12,339,620 B2
(45) Date of Patent: Jun. 24, 2025

(54) TONER

(71) Applicant: CANON KABUSHIKI KAISHA, Tokyo (JP)

(72) Inventors: Maki Imura, Chiba (JP); Tomoyo Miyakai, Tokyo (JP); Kentaro Kamae, Kanagawa (JP); Yuu Nishimura, Chiba (JP); Shin Kitamura, Ibaraki (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 668 days.

(21) Appl. No.: 17/661,168

(22) Filed: Apr. 28, 2022

(65) Prior Publication Data

US 2022/0373919 A1 Nov. 24, 2022

(30) Foreign Application Priority Data

May 12, 2021 (JP) ................................ 2021-080709

(51) Int. Cl.

| | |
|---|---|
| ***G03G 9/097*** | (2006.01) |
| ***G03G 9/08*** | (2006.01) |
| ***G03G 9/087*** | (2006.01) |

(52) U.S. Cl.

CPC ....... *G03G 9/09791* (2013.01); *G03G 9/0821* (2013.01); *G03G 9/0825* (2013.01); *G03G 9/08755* (2013.01)

(58) Field of Classification Search

CPC ............. G03G 9/09791; G03G 9/0821; G03G 9/0825; G03G 9/08755; G03G 9/09708

See application file for complete search history.

(56) References Cited

U.S. PATENT DOCUMENTS

| | | | |
|---|---|---|---|
| 7,833,687 | B2 | 11/2010 | Kato |
| 8,084,174 | B2 | 12/2011 | Hasegawa |
| 8,323,726 | B2 | 12/2012 | Naka |
| 8,697,327 | B2 | 4/2014 | Shibata |
| 8,921,023 | B2 | 12/2014 | Baba |
| 8,927,188 | B2 | 1/2015 | Naka |
| 8,974,994 | B2 | 3/2015 | Kamae |
| 8,986,914 | B2 | 3/2015 | Fujikawa |
| 9,057,970 | B2 | 6/2015 | Ida |
| 9,058,924 | B2 | 6/2015 | Komatsu |
| 9,063,443 | B2 | 6/2015 | Ishigami |
| 9,348,247 | B2 | 5/2016 | Ida |
| 9,540,483 | B2 | 1/2017 | Ida |
| 9,665,023 | B2 | 5/2017 | Kamae |
| 9,696,644 | B2 | 7/2017 | Ida |
| 9,897,934 | B2 | 2/2018 | Tamura |
| 9,915,885 | B2 | 3/2018 | Katsumata |
| 9,969,834 | B2 | 5/2018 | Ohtsu |
| 10,012,918 | B2 | 7/2018 | Ishigami |
| 10,012,920 | B2 | 7/2018 | Shibata |
| 10,012,921 | B2 | 7/2018 | Kamae |
| 10,078,281 | B2 | 9/2018 | Ida |
| 10,088,765 | B2 | 10/2018 | Miyakai |
| 10,133,201 | B2 | 11/2018 | Kamae |
| 10,203,619 | B2 | 2/2019 | Yamashita |
| 10,216,108 | B2 | 2/2019 | Iwasaki |
| 10,228,629 | B2 | 3/2019 | Tamura |
| 10,234,777 | B2 | 3/2019 | Ohtsu |
| 10,353,312 | B2 | 7/2019 | Kamae |
| 10,423,090 | B2 | 9/2019 | Ohtsu |
| 10,451,990 | B2 | 10/2019 | Kamae |
| 10,514,624 | B2 | 12/2019 | Tamura |
| 10,642,178 | B2 | 5/2020 | Yamashita |
| 10,656,545 | B2 | 5/2020 | Kamae |
| 10,775,710 | B1 | 9/2020 | Kamae |
| 10,859,931 | B2 | 12/2020 | Hashimoto |
| 10,877,386 | B2 | 12/2020 | Murayama |
| 10,969,705 | B2 | 4/2021 | Shirayama |
| 11,112,711 | B2 | 9/2021 | Ochi |
| 11,131,938 | B2 | 9/2021 | Murayama |
| 11,181,848 | B2 | 11/2021 | Ochi |
| 11,385,558 | B2 | 7/2022 | Chimoto |
| 2013/0108955 | A1 | 5/2013 | Shibata |

(Continued)

FOREIGN PATENT DOCUMENTS

| | | | |
|---|---|---|---|
| JP | 2011-34013 | A | 2/2011 |
| JP | 2014-32242 | A | 2/2014 |
| JP | 2019-219640 | A | 12/2019 |

OTHER PUBLICATIONS

U.S. Appl. No. 17/661,167, filed Apr. 28, 2022, Kentaro Kamae.

*Primary Examiner* — Peter L Vajda
*Assistant Examiner* — Grant Steven Seiler
(74) *Attorney, Agent, or Firm* — VENABLE LLP

(57) ABSTRACT

A toner, comprising a toner particle comprising a binder resin and a water-soluble polyvalent metal salt, wherein a main component of the binder resin is a polyester resin having specific acid value, the water-soluble polyvalent metal salt is a chloride, nitrate or sulfate of the specific metal, the water-soluble polyvalent metal salt has a solubility in water at 25° C. of 30 to 200 g/100 mL, in a cross-sectional observation of the toner particle, a proportion of the area of domains having a concrete surface area, relative to the total area of domains derived from the water-soluble polyvalent metal salt, is 80 to 100 area %, the expression below is satisfied, where At (area %) denotes the proportion of the total area of domains and Fm (atomic %) denotes the proportion of the polyvalent metal atom relative to the atoms in the toner as detected by X-ray fluorescence analysis.

$$0.02 \leq At/Fm \leq 0.10$$

7 Claims, 1 Drawing Sheet

(56) References Cited

U.S. PATENT DOCUMENTS

| | | | | |
|---|---|---|---|---|
| 2013/0244159 | A1 | 9/2013 | Ishigami | |
| 2014/0134535 | A1 | 5/2014 | Baba | |
| 2015/0099227 | A1 | 4/2015 | Ida | |
| 2018/0275540 | A1 | 9/2018 | Matsuo | |
| 2019/0384196 | A1* | 12/2019 | Kamae et al. ......... | G03G 9/087 |
| 2020/0409284 | A1 | 12/2020 | Matsubara | |
| 2020/0409285 | A1 | 12/2020 | Tokunaga | |
| 2021/0055668 | A1 | 2/2021 | Tamura | |
| 2021/0063903 | A1 | 3/2021 | Shibata | |
| 2021/0080848 | A1 | 3/2021 | Tsuchida | |
| 2021/0141315 | A1 | 5/2021 | Kamae | |
| 2021/0181647 | A1 | 6/2021 | Hashimoto | |
| 2021/0181649 | A1 | 6/2021 | Kanno | |
| 2021/0181650 | A1 | 6/2021 | Hama | |
| 2021/0181651 | A1 | 6/2021 | Kanno | |
| 2021/0223710 | A1 | 7/2021 | Takahashi | |
| 2021/0278774 | A1 | 9/2021 | Hashimoto | |
| 2021/0278775 | A1 | 9/2021 | Kamae | |
| 2021/0286282 | A1 | 9/2021 | Kobori | |
| 2021/0302853 | A1 | 9/2021 | Murata | |
| 2021/0302854 | A1 | 9/2021 | Kitamura | |
| 2021/0389688 | A1 | 12/2021 | Shibata | |
| 2021/0397106 | A1 | 12/2021 | Kobori | |
| 2022/0050398 | A1 | 2/2022 | Ooyama | |

* cited by examiner

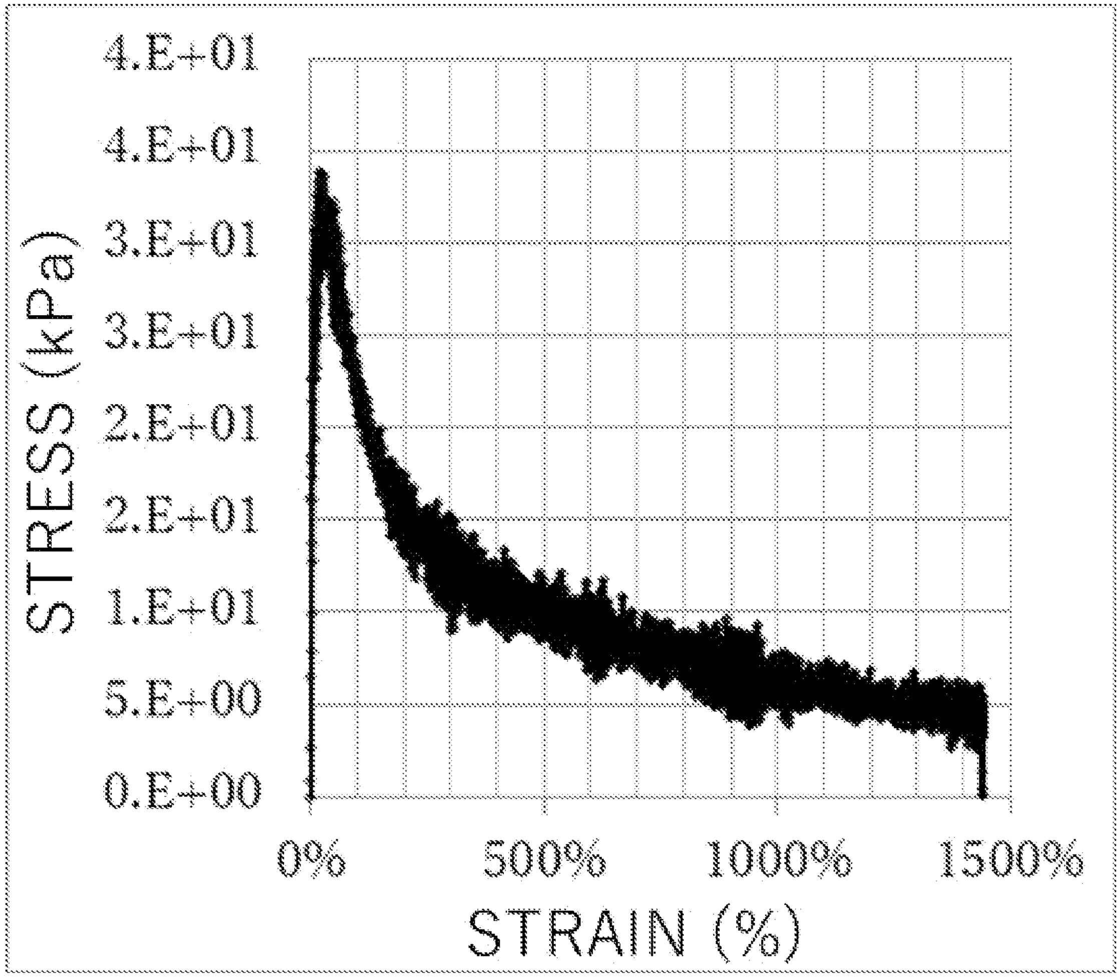
4.E+01
4.E+01
3.E+01
3.E+01
2.E+01
2.E+01
1.E+01
5.E+00
0.E+00
STRESS (kPa)
0%
500%
1000%
1500%
STRAIN (%)

TONER

BACKGROUND OF THE INVENTION

Field of the Invention

The present disclosure relates to a toner that is used for instance in electrophotographic systems, electrostatic recording systems and electrostatic printing systems.

Description of the Related Art

The growing spread of electrophotographic full-color copiers in recent years has been accompanied by a demand for improvements in terms of additional performance, naturally in terms of higher speeds and better image quality, but also in terms of energy saving, shorter recovery times from sleep mode, and compatibility with diverse media.

Specifically, the printing market demands high speed, high image quality and high productivity, while coping with a wide range of media (of paper types). For instance constant velocity properties of a medium are required such that continuous printing is possible, without modifying process speed or modifying the heating set temperature of a fixing unit according to the type of paper, even upon switchover of the paper type from heavy paper to thin paper. From the viewpoint of achieving excellent media constant velocity properties, toner is required to allow fixing to be properly completed within a wide temperature range, from a low temperature to a high temperature. Therefore, Japanese Patent Application Publication No. 2011-034013 proposes a method for using crosslinked particles in a toner binder, for the purpose of improving fixing separability.

Providing high-quality images for various media is a further demand. High-gloss paper such as coated paper or art paper is utilized for outputting image data having been captured for instance by a digital camera, a digital video camera or a mobile terminal or graphic images, such as a poster.

When an image is outputted to such a high-gloss medium, a sunk image impression is elicited and image quality and texture are impaired if the gloss of the image is lower than the paper gloss. In such applications it is therefore necessary to form high-gloss images. Accordingly, Japanese Patent Application Publication No. 2014-032242 proposes a toner having a crystalline resin added thereto, for the purpose of improving gloss.

Also, toners excellent in charge retention, exhibiting little variation in charge quantity over a prolonged sleep state, are demanded as toners that allow shortening the recovery time from the sleep state. Therefore, Japanese Patent Application Publication No. 2019-219640 proposes a toner in which the molecular mobility of a crystalline resin is suppressed, and which exhibits excellent charge retention.

SUMMARY OF THE INVENTION

When undergoing significant deformation, such as at the outlet of a fixing nip, the toner described in Japanese Patent Application Publication No. 2011-034013 exhibited strain curability, increased viscosity, and reduced contact area with a fixing film, as a result of which fixing separability can be improved. However, by increasing the crosslinking density of the toner and thereby increasing the viscosity of the toner, unevenness may accordingly occur on the fixed image surface, and gloss may decrease.

Through control of the melting rate of a crystalline resin, the toner disclosed in Japanese Patent Application Publication No. 2014-032242 exhibits by contrast high and stable gloss over a wide temperature region. However, crystalline resins have a lower volume resistance than that of amorphous resins, and accordingly tend to be prone to the occurrence of charge leakage. In consequence, charge retention may be poorer in a toner that utilizes a crystalline resin as a binder resin.

The toner disclosed in Japanese Patent Application Publication No. 2019-219640 allows suppressing molecular mobility of the crystalline resin, and can exhibit excellent charge retention. In a case however where a crystalline resin is used in which two or more types of monomer units having significantly different polarities are polymerized in blocks, the crystalline resin and the wax intermix with each other, and exudation of the wax during fixing tends to be suppressed. Fixing separability may be poorer as a result.

Such being the case, it has been difficult to satisfy all of fixing separability, high gloss, and charge retention. Accordingly, there is a pressing need to develop a toner that exhibits excellent gloss and charge retention, and that affords excellent fixing separability even in thin coated paper. The present disclosure provides a toner that exhibits excellent gloss and charge retention, and thus exhibits excellent fixing separability even in thin coated paper.

The present disclosure relates to a toner comprising a toner particle,

- the toner particle comprising
  - a binder resin, and
  - a water-soluble polyvalent metal salt, wherein
- a main component of the binder resin is a polyester resin;
- an acid value of the polyester resin is 1.0 mgKOH/g to 30.0 mgKOH/g;
- a polyvalent metal of the water-soluble polyvalent metal salt is at least one metal selected from the group consisting of Mg, Ca, Al, Fe and Zn;
- the water-soluble polyvalent metal salt is a chloride, nitrate or sulfate of the polyvalent metal;
- the water-soluble polyvalent metal salt has a solubility in water at 25° C. of 30 g/100 mL to 200 g/100 mL;
- in a cross-sectional observation of the toner particle using a transmission electron microscope, a proportion of an area of domains derived from the water-soluble polyvalent metal salt and having an area of 0.002 $\mu m^2$ to 0.050 $\mu m^2$, relative to a total area of the domains derived from the water-soluble polyvalent metal salt, is 80 area % to 100 area %; and Expression (1) below is satisfied, where At (area %) is the proportion of the total area of the domains derived from the water-soluble polyvalent metal salt relative to an area of a cross section of the toner particle, and Fm (atomic %) is a proportion of an atom of the polyvalent metal relative to atoms in the toner as detected by X-ray fluorescence analysis $$0.02 \le At/Fm \le 0.10 \quad (1).$$

The present disclosure can provide a toner that exhibits excellent gloss and charge retention, and thus exhibits excellent fixing separability even in thin coated paper. Further features of the present invention will become apparent from the following description of exemplary embodiments with reference to the attached drawings.

BRIEF DESCRIPTION OF THE DRAWINGS

The FIGURE is an example of measurement results of a strain-stress profile of toner during heating.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. Further, the term monomer unit refers to a form resulting from reaction of a monomer substance in a polymer. The term crystalline resin denotes a resin exhibiting an observable endothermic peak in a differential scanning calorimetric (DSC) measurement.

The present disclosure relates to a toner comprising a toner particle, the toner particle comprising
 a binder resin, and
 a water-soluble polyvalent metal salt, wherein
a main component of the binder resin is a polyester resin;
an acid value of the polyester resin is 1.0 mgKOH/g to 30.0 mgKOH/g;
a polyvalent metal of the water-soluble polyvalent metal salt is at least one metal selected from the group consisting of Mg, Ca, Al, Fe and Zn;
the water-soluble polyvalent metal salt is a chloride, nitrate or sulfate of the polyvalent metal;
the water-soluble polyvalent metal salt has a solubility in water at 25° C. of 30 g/100 mL to 200 g/100 mL;
in a cross-sectional observation of the toner particle using a transmission electron microscope, a proportion of an area of domains derived from the water-soluble polyvalent metal salt and having an area of 0.002 $\mu m^2$ to 0.050 $\mu m^2$, relative to a total area of the domains derived from the water-soluble polyvalent metal salt, is 80 area % to 100 area %; and Expression (1) below is satisfied, where At (area %) is the proportion of the total area of the domains derived from the water-soluble polyvalent metal salt relative to an area of a cross section of the toner particle, and Fm (atomic %) is a proportion of an atom of the polyvalent metal relative to atoms in the toner as detected by X-ray fluorescence analysis $$0.02 \leq At/Fm \leq 0.10 \quad (1).$$

The inventors have studied assiduously toners that are excellent in gloss and charge retention, and also excellent in fixing separability. As illustrated in Japanese Patent Application Publication No. 2011-034013, when the toner as a whole is strongly crosslinked with a view to improving fixing separability, the viscosity of the toner increases and unevenness forms on the surface of the fixed image, and it is no longer possible to achieve both high gloss and fixing separability. The inventors envisaged therefore the importance of eliciting local crosslinking, while avoiding strongly crosslinking of the totality of the toner.

In a case however where inorganic fine particles are added to elicit local crosslinking, however, the resin around the inorganic fine particles does become harder, but not sufficiently, and strain hardening fails to develop when the toner stretches after passing through a fixing nip. Being therefore aware of the importance of causing a binder resin to locally undergo strong crosslinking within the toner, the inventors focused on water-soluble metal salts as a material for eliciting strong local crosslinking in a binder resin. The inventors found as a result that a desired toner can be obtained by using a water-soluble metal salt and through control of the crosslinked state of the water-soluble metal salt and a polyester resin which is a binder resin.

By using a water-soluble metal salt, specifically, water is adsorbed on the surface of the metal salt, ion dissociation is readily induced, and the affinity with the acidic polar groups of the binder resin can be enhanced, such that fixing separability is improved. It has been found that local crosslinking is realized, high gloss is maintained, and the toner exhibits excellent fixing separability, by causing a water-soluble metal salt to be present as domains in the toner. It was also found that toner is achieved that is excellent in gloss and fixing separability, without drops in charge retention, by eliciting local crosslinking of acidic polar groups of a polyester resin and metal ions of a water-soluble polyvalent metal salt, within the toner.

The water-soluble polyvalent metal salt will be described first. The polyvalent metal of the water-soluble polyvalent metal salt is at least one metal selected from the group consisting of Mg, Ca, Al, Fe and Zn. The polyvalent metal is deemed to be crosslinked with an acidic polar group in a plurality of polyester resin molecular chains, so that, as a result, the molecular chains of the polyester resin are in a dense state centered on the metal ions of the polyvalent metal. As a result, strong interactions/intermolecular forces can be generated, and excellent fixing separability can be obtained.

Moreover, the metal ions of the polyvalent metals have a large ionic radius relative to that of the acidic polar groups of the polyester resin; as a result, strong local crosslinking can be brought about, and high gloss can be maintained. The polyvalent metal in the water-soluble polyvalent metal salt is at least one selected from the group consisting of Mg, Ca, Al, Fe and Zn. The polyvalent metal is preferably at least one selected from the group consisting of Mg, Ca and Al.

The water-soluble polyvalent metal salt is at least one selected from the group consisting of chlorides, nitrates and sulfates of polyvalent metals. Such a water-soluble polyvalent metal salt interacts weakly with the resin component, and hence the water-soluble polyvalent metal salt can be caused to be locally present in the toner. The water-soluble polyvalent metal forms domains through local crosslinking with the acidic polar groups of the polyester resin, as a result of which high gloss can be maintained. In particular, the water-soluble polyvalent metal salt is more preferably a sulfate of the polyvalent metal.

The water-soluble polyvalent metal salt has a solubility in water at 25° C. of 30 g/100 mL to 200 g/100 mL. Toner viscosity can be increased, and excellent fixing separability obtained, through crosslinking of the acidic polar groups of the polyester resin and the metal ions of the water-soluble polyvalent metal salt. By using a highly water-soluble metal salt, i.e. a salt having a solubility in water of 30 g/100 mL or more, water becomes adsorbed onto the surface of the metal salt, and ion dissociation is readily induced. As a result, the affinity towards the acidic polar groups of the polyester resin can be increased, and excellent fixing separability can be obtained. By using a metal salt having a solubility of 200 g/100 mL or less, on the other hand, hygroscopicity in a high-temperature, high-humidity environment can be suppressed, and charge retention is improved.

Preferably, the solubility of the water-soluble polyvalent metal salt in water at 25° C. is 50 g/100 mL or more. Ion dissociation derived from adsorption of water onto the metal salt surface is readily induced, and fixing separability is further improved as a result. Preferably, the solubility of the water-soluble polyvalent metal salt in water at 25° C. is 150 g/100 mL or less, and more preferably 100 g/100 mL or less. Therefore, hygroscopicity in a high-temperature, high-humidity environment can be suppressed, and charge retention is further improved.

The toner particle contains a binder resin and a water-soluble polyvalent metal salt. The main component of the binder resin is a polyester resin. The polyester resin is preferably an amorphous polyester resin. The term main component signifies that the content ratio of the component is 50 mass % or higher. The content ratio of the polyester resin in the binder resin is preferably from 70 mass % to 100 mass %, more preferably from 80 mass % to 100 mass %, yet more preferably from 90 mass % to 100 mass %, and even yet more preferably from 95 mass % to 100 mass %. The binder resin may contain other resins in addition to the polyester resin, so long as the above effect is not impaired. For instance the following polymers can be used as other resins.

Homopolymer of styrene and substitution products thereof such as polystyrene, poly-p-chlorostyrene, polyvinyl toluene, and the like; styrene-(meth)acrylic copolymer resins such as styrene-p-chlorostyrene copolymer, styrene-vinyl toluene copolymer, styrene-vinyl naphthalene copolymer, styrene-acrylic acid ester copolymers, styrene-methacrylic acid ester copolymers, and the like; polyester resins and hybrid resins obtained by mixing or partially reacting a polyester resin and a styrene-(meth)acrylic copolymer resin; polyvinyl chloride, phenolic resins, natural resin-modified phenolic resins, natural resin-modified maleic resins, acrylic resins, methacrylic resins, polyvinyl acetate, silicone resins, polyester resins, polyurethane resins, polyamide resins, furan resins, epoxy resins, xylene resins, polyethylene resins, polypropylene resins and the like.

Examples of the polyester resin include the following condensation polymers. The polyester resin is preferably a condensation polymer of a polyhydric alcohol (dihydric, trihydric or higher alcohol) and a polyvalent carboxylic acid (divalent or trivalent or higher carboxylic acid), an acid anhydride thereof, or a lower alkyl ester thereof.

To produce a branched polymer it is preferable to elicit partial crosslinking within the molecule of the polyester resin. To that end, there is preferably used use a trivalent or higher polyfunctional compound. As starting monomers, therefore, the polyester resin preferably contains a trivalent or higher carboxylic acid or acid anhydride thereof or lower alkyl ester thereof, and/or a trihydric or higher alcohol. The polyester resin is more preferably a condensation polymer of a dihydric alcohol, and a divalent carboxylic acid or an acid anhydride thereof or lower alkyl ester thereof, and a trivalent or higher carboxylic acid or an acid anhydride thereof or lower alkyl ester thereof. The trivalent or higher carboxylic acid preferably includes a trivalent carboxylic acid and a tetravalent carboxylic acid.

The following polyhydric alcohol monomers can be used as a polyhydric alcohol monomer for the polyester resin. Examples of the dihydric alcohol component include ethylene glycol, propylene glycol, 1,3-butanediol, 1,4-butanediol, 2,3-butanediol, diethylene glycol, triethylene glycol, 1,5-pentanediol, 6-hexanediol, neopentyl glycol, 2-ethyl-1,3-hexanediol, hydrogenated bisphenol A, bisphenol represented by formula (A) and derivatives thereof.

(A)

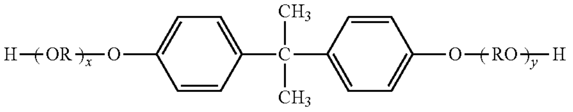

(in the formula, R is ethylene or propylene, x and y are each an integer of 0 or more, and the average value of x+y is from 0 to 10).

Diols represented by formula (B) can be mentioned.

(B)

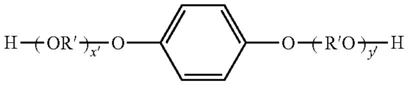

(in formula, R' is

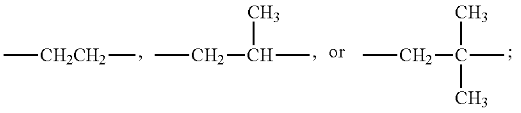

x' and y' are each an integer of 0 or more; and the average value of x'+y' is 0 to 10).

Examples of the trivalent or higher alcohol component include sorbitol, 1,2,3,6-hexanetetrol, 1,4-sorbitan, pentaerythritol, dipentaerythritol, tripentaerythritol, and 1,2,4-butanetriol. 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane and pentaerythritol are preferably used. These dihydric alcohols and trihydric or higher alcohols may be used singly or in combination of a plurality thereof.

The following polyvalent carboxylic acid monomers can be used as a polyvalent carboxylic acid monomer used for the polyester resin. Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids, lower alkyl esters thereof and the like. Among these, maleic acid, fumaric acid, terephthalic acid and n-dodecenyl succinic acid are preferably used.

Examples of the trivalent or higher carboxylic acid, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof and lower alkyl esters thereof. Among these, 1,2,4-benzenetricarboxylic acid, that is, trimellitic acid or a derivative thereof is particularly preferably used because it is inexpensive and the reaction control is easy. These divalent carboxylic acids and the like and trivalent or higher carboxylic acids can be used alone or in combination of a plurality thereof.

Preferred trivalent or higher carboxylic acids include the following tetravalent carboxylic acids, from the viewpoint of further facilitating the formation of crosslinking points: 1,1,2,2-ethanetetracarboxylic acid, 1,1,1,2-ethanetetracarboxylic acid, 1,1,3,3-propanetetracarboxylic acid, 1,1,2,3-propanetetracarboxylic acid, 1,1,2,2-propanetetracarboxylic acid, 2-(carboxymethyl)propane-1,1,3-tricarboxylic acid, 1,1,4,4-butanetetracarboxylic acid, 1,1,2,4-butanetetracarboxylic acid, 1,1,3,4-butanetetracarboxylic acid, 1,1,2,2-butanetetracarboxylic acid, 1,1,3,3-butanetetracarboxylic acid, 2,2,3,3-butanetetracarboxylic acid, 1,2,3,4-cyclobutanetetracarboxylic acid, 1,1,5,5-pentanetetracarboxylic acid, 1,1,4,5-pentanetetracarboxylic acid, 1,1,3,5-pentanetetracarboxylic acid, 1,1,2,5-pentanetetracarboxylic acid, 1,1,4,4-pentanetetracarboxylic acid, 1,1,3,4-pentanetetracarboxylic acid, 1,1,2,4-pentanetetracarboxylic acid, 1,1,3,3-pentanetetracarboxylic acid, 1,1,2,3-pentanetetracarboxylic acid, 1,1,2,2-pentanetetracarboxylic acid, 1,2,3,4-pentanetetracarboxylic acid, 1,2,3,5-pentanetetracarboxylic acid, 3-(carboxymethyl)butane-1,1,4-tricarboxylic acid, 2-(carboxymethyl)butane-1,1,4-tricarboxylic acid, 2-methylbutane-1,1,4,4-tetracarboxylic acid, 1,1,6,6-hexanetetracarboxylic acid, 1,1,5,6-hexanetetracarboxylic acid, 1,2,3,4-hexanetetracarboxylic acid, 1,2,3,5-hexanetetracarboxylic acid, 1,2,3,6-hexanetetracarboxylic acid, 2-methylpentane-1,1,5,5-tetracarboxylic acid, 3-methylpentane-1,1,5,5-tetracarboxylic acid, 2,3-dimethylbutane-1,1,4,4-tetracarboxylic acid, 1,1,7,7-heptanetetracarboxylic acid, 1,1,8,8-octanetetracarboxylic acid, 1,1,9,9-nonanetetracarboxylic acid, 1,1,10,10-decanetetracarboxylic acid and 3,5-bis(carboxymethyl)-3,4,4,5-tetramethylheptanedioic acid, and the like.

Herein 3,5-bis(carboxymethyl)-3,4,4,5-tetramethylheptanedioic acid is preferably used among the foregoing. The content ratio of the monomer units resulting from polymerization of a trivalent or higher (preferably a trivalent and a tetravalent, more preferably a tetravalent) carboxylic acid, among the constituent components of the polyester resin, is preferably from 1.0 to 10.0 mol %, more preferably from 1.5 to 5.0 mol %, and yet more preferably from 2.0 to 4.0 mol %. The content ratio of the monomer units resulting from polymerization of a trivalent or higher (preferably a trivalent and a tetravalent, more preferably a tetravalent) carboxylic acid, among the constituent components of the polyester resin, is preferably from 1.0 to 20.0 mass %, more preferably from 2.0 to 10.0 mass %, and yet more preferably from 3.0 to 8.0 mass %.

A method for producing the polyester resin is not particularly limited, and known methods can be used. For example, the above-mentioned alcohol monomer and carboxylic acid monomer are simultaneously charged and polymerized through an esterification reaction or a transesterification reaction and a condensation reaction to produce a polyester resin. The polymerization temperature is not particularly limited, but is preferably in the range of from 180° C. to 290° C. In the polymerization of the polyester resin, for example, a polymerization catalyst such as a titanium-based catalyst, a tin-based catalyst, zinc acetate, antimony trioxide, germanium dioxide or the like can be used. In particular, the polyester resin is more preferably a polyester resin polymerized using a tin-based catalyst.

The acid value of the polyester resin is from 1.0 mgKOH/g to 30.0 mgKOH/g. When the acid value is 1.0 mgKOH/g or higher, toner viscosity can be increased, and excellent fixing separability can be obtained through crosslinking of the acidic polar groups of the polyester resin and the metal ions of the water-soluble polyvalent metal salt. When the acid value is 30.0 mgKOH/g or lower, hygroscopicity in a high-temperature, high-humidity environment can be suppressed, and charge retention is improved.

Preferably, the acid value of the polyester resin is 5.0 mgKOH/g or higher. As a result, the number of crosslinking points between the acidic polar groups of the polyester resin and the metal ions of the water-soluble polyvalent metal salt is increased, and fixing separability is further improved. Preferably, the acid value of the polyester resin is 25.0 mgKOH/g or less. As a result, hygroscopicity in a high-temperature, high-humidity environment can be suppressed, and charge retention is further improved. More preferably, the acid value of the polyester resin is from 8.0 mgKOH/g to 15.0 mgKOH/g.

In a cross-sectional observation of the toner particle using a transmission electron microscope (TEM), the proportion of the area (surface area) of domains derived from a water-soluble polyvalent metal salt and having the area (surface area) of from 0.002 $\mu m^2$ to 0.050 $\mu m^2$, relative to the total area of domains derived from the water-soluble polyvalent metal salt, is from 80 area % to 100 area %.

The term domains derived from a water-soluble polyvalent metal salt denotes domains formed through crosslinking of acidic polar groups in the polyester resin and metal ions of the water-soluble polyvalent metal salt. Such domains can be distinguished through binarization with a specific threshold value, using image processing software "ImageJ", in a cross-sectional observation of the toner particle by TEM. The concrete procedure involved will be described further on.

When the area ratio of the domains lies within the above ranges, the acidic polar groups of the polyester resin and the metal ions of the water-soluble polyvalent metal salt become crosslinked, toner viscosity can be increased, and excellent fixing separability is obtained. Furthermore, high gloss can be maintained through local crosslinking of the acidic polar groups of the polyester resin and the metal ions of the water-soluble polyvalent metal salt.

In order to bring out excellent fixing separability, it is necessary to raise the viscosity of the toner through crosslinking of the acidic polar groups of the polyester resin and the metal ions of the water-soluble polyvalent metal salt. Therefore, the domains derived from the water-soluble polyvalent metal salt must be present dispersed to a certain extent, while being of not too large a size, and it is necessary that the acidic polar groups of the polyester resin and the metal ions of the water-soluble polyvalent metal salt be crosslinked. Therefore, it is essential to form domains derived from a water-soluble polyvalent metal salt having a surface area of 0.050 $\mu m^2$ or less.

Also in order to bring out excellent gloss, it is necessary to elicit local crosslinking of the acidic polar groups of the polyester resin and the metal ions of the water-soluble polyvalent metal salt, in the toner. Therefore, it is necessary that domains be formed through localization, to a certain extent, of domains derived from the water-soluble polyvalent metal salt, and that the acidic polar groups of the polyester resin and the metal ions of the water-soluble polyvalent metal salt be crosslinked with each other. Accordingly, it is essential to form domains derived from the water-soluble polyvalent metal salt and having a surface area of 0.002 $\mu m^2$ or larger.

The area ratio of these domains derived from the water-soluble polyvalent metal salt and having an area from 0.002 $\mu m^2$ to 0.050 $\mu m^2$ must be from 80 area % to 100 area %, relative to the total area of the domains. As a result, toner viscosity can be increased through crosslinking of the acidic polar groups of the polyester resin and the metal ions of the water-soluble polyvalent metal salt, and it also becomes possible to elicit local crosslinking of the acidic polar groups of the polyester resin and the metal ions of the water-soluble polyvalent metal salt, in the toner, so that both fixing separability and gloss can be improved as a result.

The area ratio of the domains derived from the water-soluble polyvalent metal salt and having a surface area from 0.002 $\mu m^2$ to 0.050 $\mu m^2$ is preferably from 90 area % to 100 area %, and more preferably from 95 area % to 100 area % relative to the total area of domains. As a result, local crosslinking can be strongly elicited in the binder resin, and both fixing separability and glossiness can be further improved.

Means for causing domains derived from a water-soluble polyvalent metal salt to be present in a cross section of a toner particle include methods such as those below. Given that the water-soluble polyvalent metal salt does not disperse in the toner particle at an ionic size, but must form domains, it is therefore preferable to resort to a toner production method of dry type. Examples thereof include a method in which a water-soluble polyvalent metal salt is added during the production of the toner in accordance with a pulverization method, and in which domains are caused to be formed at the time of melt kneading.

In a pulverization method, the domains can be controlled through adjustment of the temperature and dwell time of melt kneading. The melt kneading temperature is preferably from 100° C. to 160° C., more preferably from 120° C. to 140° C. The dwell time during melt kneading is preferably from 30 to 100 seconds, more preferably from 45 to 75 seconds.

The surface area of the domains can be increased by lowering the melt kneading temperature, and can be reduced by raising the melt kneading temperature. The surface area of the domains can also be controlled on the basis of the dwell time of melt kneading. The surface area of the domains can be increased by lengthening the dwell time of melt kneading, and can be reduced by shortening the dwell time of melt kneading.

In a cross-sectional observation of the toner particle using a transmission electron microscope, Expression (1) below is satisfied where At (area %) denotes the proportion of the total area of domains derived from a water-soluble polyvalent metal salt relative to the area of the cross section of the toner particle, and Fm (atomic %) denotes the proportion of the polyvalent metal atoms relative to the atoms in the toner as detected by X-ray fluorescence analysis (XRF).

$$0.02 \leq At/Fm \leq 0.10 \quad (1)$$

Satisfying Expression (1) above is indicative of a high proportion of the metal salt that forms domains derived from a water-soluble polyvalent metal salt, relative to all the water-soluble polyvalent metal salts contained in the toner. Accordingly, the macroscopic viscosity of the toner can be controlled to be low, and high gloss can be maintained, by forming domains through local crosslinking of the acidic polar groups of the polyester resin and the metal ions of the water-soluble polyvalent metal salt. When At/Fm is less than 0.02, crosslinking is finer and more uniform, and gloss decreases. When At/Fm is 0.10 or less, domains can be uniformly distributed in the toner, and the toner viscosity can be increased, so that fixing separability is improved as a result.

Preferably, Expression (2) below is satisfied.

$$0.04 \leq At/Fm \leq 0.09 \quad (2)$$

Satisfying Expression (2) above is tantamount to indicating that the proportion of the metal salt that forms domains derived from the water-soluble polyvalent metal salt is higher than that of all the water-soluble polyvalent metal salts contained in the toner. As a result, it becomes possible to elicit local crosslinking of metal ions, and gloss is further improved. In addition, also fixing separability is further improved. Herein At/Fm can be increased by lengthening the dwell time of melt kneading, and can be reduced by shortening the dwell time of melt kneading.

Preferably, At (area %) is from 0.1 to 6.0, and more preferably from 0.2 to 0.8. Preferably, Fm (atomic %) is from 1.0 to 75.0, and more preferably from 3.0 to 15.0.

In a cross-sectional observation of the toner particle using a transmission electron microscope (TEM), the proportion of the area (surface area) of domains derived from a water-soluble polyvalent metal salt and having a surface area from 0.002 $m^2$ to 0.050 $\mu m^2$, is preferably from 0.10 area % to 5.00 area %, more preferably from 0.25 area % to 2.00 area %, relative to the total area of the toner particle. When the above area ratio is 0.10 area % or higher, there are more than enough crosslinking points of the acidic polar groups of the polyester resin and the metal ions of the water-soluble polyvalent metal salt, and as a result fixing separability is further improved. When by contrast the area ratio is 5.00 area % or lower, the crosslinking points of the acidic polar groups of the polyester resin and the metal ions of the water-soluble polyvalent metal salt are prevented from becoming too numerous, and gloss is further improved as a result.

The methods below are illustrative instances of means for bringing the proportion of the surface area of domains derived from a water-soluble polyvalent metal salt and having a surface area from 0.002 $\mu m^2$ to 0.050 $\mu m^2$, relative to the total area of the toner particle, so as to lie in the range from 0.10 area % to 5.00 area %. For instance, one such method involves adding a water-soluble polyvalent metal salt at the time of toner production by pulverization, and adjusting the temperature and dwell time of melt kneading. The melt kneading temperature is preferably from 100° C. to 160° C.

Further, stress at 200% strain, in a strain-stress profile at 95° C. of the toner, is preferably from 20 kPa to 40 kPa, more preferably from 22 kPa to 32 kPa. After passing the fixing nip, the toner is stretched at most by about 200%. Therefore, an instance where stress at 200% strain is from 20 kPa to 40 kPa, in a strain-stress profile at 95° C. of the toner, indicates that the acidic polar groups of the polyester resin and the metal ions of the water-soluble polyvalent metal salt have local crosslinking points, and that toner stress relative to strain at high temperature is of appropriate strength. Better fixing separability and gloss can be obtained as a result.

Means for bringing the above stress to lie within the range from 20 kPa to 40 kPa include for instance a method that involves adding a water-soluble polyvalent metal salt at the time of toner production by pulverization, and adjusting the temperature and dwell time of melt kneading.

The above stress can be readily adjusted to be from 20 kPa to 40 kPa in a case where the acid value of the polyester resin is from 5.0 mgKOH/g to 25.0 mgKOH/g, and the polyvalent metal of the water-soluble polyvalent metal salt is at least one selected from the group consisting of Mg, Ca, Al, Fe and Zn.

The composition of the preferred toner is described in detail below.

Wax

The toner particle may contain a wax. Examples of the wax include the following.

Hydrocarbon waxes such as low molecular weight polyethylene, low molecular weight polypropylene, alkylene copolymers, microcrystalline wax, paraffin wax and Fischer-Tropsch waxes;

oxides of hydrocarbon waxes or block copolymers thereof, such as polyethylene oxide wax;

waxes the main component of which is a fatty acid ester, such as carnauba wax;

and partially or fully deoxidized fatty acid esters, such as deoxidized carnauba wax.

Preferred among the foregoing are hydrocarbon waxes such as paraffin wax or Fischer-Tropsch waxes, or fatty acid ester waxes such as carnauba wax, in terms of improving the low-temperature fixing performance and hot offset resistance of the toner.

Hydrocarbon waxes are more preferable herein, from the viewpoint of the fixing separability of the toner. The content of wax content in the toner particle is preferably from 1.0 parts by mass to 20.0 parts by mass relative to 100 parts by mass of the binder resin. Hot offset resistance at high temperature is further improved when the content of wax lies in the above range.

From the viewpoint of achieving both storability and hot offset resistance in the toner, a peak temperature of a maximum endothermic peak of the toner preferably satisfies the following. Specifically, the peak temperature of a maximum endothermic peak lying in a temperature range from 30° C. to 200° C., in an endothermic curve obtained upon a rise in temperature as measured using a differential scanning calorimeter (DSC), is preferably from 50° C. to 110° C.

Colorant

The toner particle may contain a colorant, as needed. Examples of the colorant include those listed below. Examples of black colorants include carbon black, and colorants resulting from color matching of yellow colorants, magenta colorants and cyan colorants to black. As the colorant there may be used a pigment singly, or a dye and a pigment in combination. Preferably, a dye and a pigment are used concomitantly, from the viewpoint of image quality in full-color images.

Examples of pigments for a magenta toner are presented hereinbelow. C. I. Pigment Red 1, 2, 3, 4, 5, 6, 7, 8, 9, 10, 11, 12, 13, 14, 15, 16, 17, 18, 19, 21, 22, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35.

Examples of dyes for a magenta toner are presented hereinbelow. C. I. Solvent Red 1, 3, 8, 23, 24, 25, 27, 30, 49, 81, 82, 83, 84, 100, 109, 121; C. I. Disperse Red 9; C. I. Solvent Violet 8, 13, 14, 21, 27; oil-soluble dyes such as C. I. Disperse Violet 1, C. I. Basic Red 1, 2, 9, 12, 13, 14, 15, 17, 18, 22, 23, 24, 27, 29, 32, 34, 35, 36, 37, 38, 39, 40; and basic dyes such as C. I. Basic Violet 1, 3, 7, 10, 14, 15, 21, 25, 26, 27, 28.

Examples of pigments for a cyan toner are presented hereinbelow. C. I. Pigment Blue 2, 3, 15:2, 15:3, 15:4, 16, 17; C. I. Vat Blue 6; C. I. Acid Blue 45, and copper phthalocyanine pigments having a phthalocyanine skeleton substituted with 1 to 5 phthalimidomethyl groups. Dyes for a cyan toner are exemplified by C. I. Solvent Blue 70.

Examples of pigments for a yellow toner are presented hereinbelow. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20. Dyes for a yellow toner are exemplified by C. I. Solvent Yellow 162.

These colorants can be used singly or in a mixture, or in the form of a solid solution. The colorant is selected in consideration of hue angle, saturation, lightness, light resistance, OHP transparency, and dispersibility in toner particle.

The content of the colorant is preferably 0.1 parts by mass to 30.0 parts by mass with respect to 100 parts by mass of the binder resin.

Charge Control Agent

The toner particle may contain a charge control agent, as needed. By incorporating a charge control agent it becomes possible to stabilize charge characteristics and to control a triboelectric charge quantity optimized for the developing system. A known agent can be used as the charge control agent, but particularly preferred are metal compounds of aromatic carboxylic acids, which are colorless, afford high toner charging speed, and are capable of holding stably a constant charge quantity.

Examples of negative-type charge control agents include metal salicylate compounds, metal naphthoate compounds, metal dicarboxylate compounds, polymeric compounds having a sulfonic acid or a carboxylic acid in a side chain, polymeric compounds having a sulfonate salt or sulfonic acid esterification product in a side chain, polymeric compounds having a carboxylate or carboxylic acid esterification product in a side chain, boron compounds, urea compounds, silicon compounds, and calixarenes.

The charge control agent may be added internally or externally to the toner particle. The content of the charge control agent is preferably from 0.2 parts by mass to 10.0 parts by mass, more preferably from 0.5 parts by mass to 10.0 parts by mass, relative to 100 parts by mass of the binder resin.

Inorganic Fine Particles

The toner may contain inorganic fine particles as an external additive, as needed. Examples of the inorganic fine particles include fine particles such as silica fine particles, titanium oxide fine particles, alumina fine particles, and double oxide fine particles of the foregoing. Among inorganic fine particles, silica fine particles and titanium oxide fine particles are preferred for the purpose of improving flowability and uniformizing charge. The inorganic fine particles are preferably hydrophobized using a hydrophobic agent such as a silane compound, a silicone oil, or a mixture thereof.

Preferably, the specific surface area of the inorganic fine particles as an external additive is from 50 $m^2/g$ to 400 $m^2/g$, from the viewpoint of improving flowability. The specific surface area of the inorganic fine particles as an external additive is preferably from 10 $m^2/g$ to 50 $m^2/g$, from the viewpoint of improving durability stability. Inorganic fine particles having a specific surface area lying in the above range may be used in combination, in order to achieve both improved flowability and durability stability.

The content of the external additive is preferably from 0.1 parts by mass to 10.0 parts by mass relative to 100 parts by mass of the toner particle. A known mixer such as a Henschel mixer can be used for mixing the toner particle and the external additive.

Developer

The toner can be used as a one-component developer, but may also be mixed with a magnetic carrier and be used as a two-component developer, in order to further improve dot reproducibility and also in order to achieve a stable image over long periods of time.

Magnetic carriers include generally known materials such as, for example, iron oxide; metal particles such as iron, lithium, calcium, magnesium, nickel, copper, zinc, cobalt, manganese, chromium and rare earths, alloy particles thereof, and oxide particles thereof; magnetic bodies such as ferrites; magnetic body-dispersed resin carriers (the so-called resin carriers) including a binder resin in which the magnetic bodies are held in a dispersed state; and the like.

When the toner is mixed with a magnetic carrier and used as a two-component developer, the mixing ratio of the magnetic carrier at that time is preferably from 2% by mass to 15% by mass, and more preferably 4% by mass to 13% by mass as the toner concentration in the two-component developer.

Method for Producing a Toner Particle

The toner particle can be produced in accordance with a known toner particle production method, such as melt kneading method, emulsion aggregation method or dissolution suspension method. A toner production procedure in accordance with a pulverization method will be explained next. In a pulverization method the material of the toner particle is melt-kneaded and pulverized, to yield a toner particle. The melt kneading temperature is preferably from 100° C. to 160° C., more preferably from 118° C. to 142° C.

In a raw material mixing step, for example, a binder resin, a water-soluble polyvalent metal salt and, if necessary, other components such as a wax, a colorant, and a charge control agent are weighed in predetermined amounts, compounded and mixed as materials constituting toner particles. Examples of the mixing apparatus include a double-cone mixer, a V-type mixer, a drum mixer, a super mixer, a Henschel mixer, a NAUTA mixer, and a MECHANO HYBRID (manufactured by Nippon Coke Industry Co., Ltd.).

Next, the mixed materials are melt-kneaded to disperse the materials in the binder resin. In the melt-kneading process, a batch-type kneader such as a pressure kneader or a Banbury mixer, or a continuous-type kneader can be used, and a single- or twin-screw extruder is mainly used because of its superiority of continuous production. Specific examples include a KTK type twin-screw extruder (manufactured by Kobe Steel, Ltd.), a TEM type twin-screw extruder (manufactured by Toshiba Machine Co., Ltd.), a PCM kneader (made by Ikegai Corp.), a twin-screw extruder (manufactured by KCK Co.), Co-Kneader (manufactured by Buss AG) and KNEADEX (manufactured by Nippon Coke & Engineering Co., Ltd.). Furthermore, the resin composition obtained by melt-kneading may be rolled with a two-roll mill or the like, and may be cooled with water or the like in the cooling step.

The cooled resin composition is then pulverized to the desired particle size in the pulverization step. In the pulverization step, coarse pulverization is performed with a pulverizing device such as, for example, a crusher, a hammer mill, or a feather mill. Thereafter, for example, the material is finely pulverized by a KRYPTON system (manufactured by Kawasaki Heavy Industries, Ltd.), SUPER ROTOR (manufactured by Nisshin Engineering Co., Ltd.), TURBO MILL (manufactured by Turbo Kogyo) or an air jet type fine pulverizing device.

After that, if necessary, classification is performed using a classifier or sieving machine such as ELBOW JET (manufactured by Nittetsu Mining Co., Ltd.) of an inertial classification type, TURBOPLEX (manufactured by Hosokawa Micron Corporation) of a centrifugal classification type, TSP Separator (manufactured by Hosokawa Micron Corporation), or FACULTY (manufactured by Hosokawa Micron Corporation).

The obtained toner particle may be used, as-is, as the toner. An external additive may be externally added to the surface of the toner particle, as the case may require, to thereby yield a toner. The method involved in an external addition treatment may include mixing a predetermined amount of various known external additives with a classified toner, and stirring and mixing the whole using an external addition apparatus in the form of a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

Methods for measuring various physical properties will be described below.

Measurement of the Acid Value of a Resin

The acid value is the number of mg of potassium hydroxide necessary for neutralizing the acid contained in 1 g of a sample. The acid value of the binder resin is measured according to JIS-K0070-1992, specifically by following the procedure below.

(1) Preparation of Reagents

Herein 1.0 g of phenolphthalein is dissolved in 90 mL of ethyl alcohol (95 vol %), with addition of ion-exchanged water up to 100 mL, to obtain a phenolphthalein solution. Then 7 g of special-grade potassium hydroxide are dissolved in 5 mL of water, and ethyl alcohol (95 vol %) is added up to 1 L. The resulting solution is placed in an alkali-resistant container, so as to preclude contact with carbon dioxide, and is allowed to stand for 3 days, followed by filtration, to yield a potassium hydroxide solution. The obtained potassium hydroxide solution is stored in an alkali-resistant container. To work out the factor of the potassium hydroxide solution, 25 mL of 0.1 mol/L hydrochloric acid are placed in an Erlenmeyer flask, several drops of the phenolphthalein solution are added, and titration is carried out using the above potassium hydroxide solution, the factor being then worked out on the basis of the amount of the above potassium hydroxide solution necessary for neutralization. Hydrochloric acid produced in accordance with JIS-K8001-1998 is used as the above 0.1 mol/L hydrochloric acid.

(2) Operation (A) Main Test

Herein 2.0 g of a sample are weighed exactly in an Erlenmeyer flask of 200 mL, followed by addition of 100 mL of a toluene/ethanol (2:1) mixed solution, and subsequent dissolution over 5 hours. A few drops of the phenolphthalein solution are added next as an indicator, and titration is performed using the above potassium hydroxide solution. The end point of the titration occurs when the light red color of the indicator persists for about 30 seconds.

(B) Blank Test

Titration is performed in the same way as above but herein no sample is used (i.e. only a mixed solution of toluene/ethanol (2:1) is used).

(3) The Acid Value is then Calculated by Plugging the Obtained Results into the Expression Below.

$$A=[(C-B)\times f\times 5.61]/S$$

In the expression, A: acid value (mgKOH/g), B: addition amount (mL) of the potassium hydroxide solution in the blank test, C: addition amount (mL) of the potassium hydroxide solution in the main test, f: factor of the potassium hydroxide solution, and S: mass (g) of the sample.

Separation of the Polyester Resin from the Toner

Each of the materials contained in the toner can be separated from the toner by exploiting differences in the solubilities, in a solvent, of the materials.

First separation: the toner is dissolved in methyl ethyl ketone (MEK) at 23° C., to separate a soluble matter (amorphous polyester) and an insoluble matter (crystalline polyester, wax (release agent), colorant, inorganic fine particles and so forth).

Second separation: the insoluble matter (crystalline polyester, wax, colorant, inorganic fine particles and so forth) obtained in the first separation is dissolved in MEK at 100° C., to separate a soluble matter (crystalline polyester and wax) from an insoluble matter (colorant, inorganic fine particles and so forth).

Third separation: the soluble matter (crystalline polyester and wax) obtained in the second separation is dissolved in chloroform at 23° C., to separate a soluble matter (crystalline polyester) and an insoluble matter (wax).

Measurement of Solubility

To measure the solubility in water at a temperature of 25° C. there is measured the amount (g) of a water-soluble polyvalent metal salt dissolved in 100 mL of water held at 25° C.

Cross-Sectional Observation of Toner Particle

Firstly, the toner is thoroughly dispersed in a photocurable epoxy resin, and then the epoxy resin is cured by being irradiated with ultraviolet rays. The obtained cured product is cut using a microtome equipped with a diamond blade, to prepare a flaky sample having a thickness of 100 nm. The above sample is dyed with ruthenium tetroxide, and thereafter a cross section of the toner particle is observed using a transmission electron microscope (TEM) (product name: electron microscope Tecnai TF20XT, by FEI Corporation), under conditions that include an acceleration voltage of 120 kV, to yield a TEM image. As the cross section of the toner particle there is selected herein a cross section having a major axis diameter from 0.9 to 1.1 times the number-average particle (D1) of the toner, in accordance with the below-described method for measuring the number-average particle diameter (D1) of the toner particle.

The domains derived from the water-soluble polyvalent metal salt are extracted from the observed image through binarization, as described below, using the image processing software "ImageJ" (available from https://imagej.nih.gov/ij/). The observed image is binarized by selecting "Image-Adjust-Threshold" and setting a threshold value so as to extract the entire cross section of the toner particle, in the displayed dialog box. Binarization is performed by modifying only threshold values, in the same image and in accordance with the same procedure, so that there are extracted only domains derived from the respective water-soluble polyvalent metal salt. Specifically, the domains are extracted by setting the threshold value to a 120/255 gradation. The domains observed according to above setting are defined as domains derived from a water-soluble polyvalent metal salt.

In the binarized image, the surface area of the domains is set in "Analyze-Analyze Particle", and the total area of domains in the range from 0.002 $\mu m^2$ to 0.050 $m^2$ is calculated. The image processing software "Image-Pro Plus (by Media Cybernetics, Inc.)" can be used to measure surface areas. In addition there are calculated also the surface area of the cross section of the toner particle, and the total area of domains derived from a water-soluble polyvalent metal salt and being present in a cross section of the toner particle. From the calculated values there are worked out a proportion At (area %) of the total area of domains derived from a water-soluble polyvalent metal salt relative to the area of the cross section of the toner particle, and the proportion of the surface area of domains in the range from 0.002 $\mu m^2$ to 0.050 $\mu m^2$, relative to the total area of domains derived from the water-soluble polyvalent metal salt. Herein 100 toner particles are observed, and the arithmetic mean value thereof is adopted.

X-Ray Fluorescence Analysis Method (XRF)

The X-ray fluorescence measurement of various elements conforms to JIS K 0119-1969, but is specifically carried out as follows. The measurement device that is utilized herein is a wavelength-dispersive X-ray fluorescence analyzer "Axios" (by PANalytical B. V.), with dedicated software "SuperQ ver. 4.0 F" (by PANalytical B. V.) for setting measurement conditions and analyzing measurement data. Rhodium (Rh) is used as the anode of the X-ray tube, the measurement atmosphere is vacuum, the measurement diameter (collimator mask diameter) is set to 27 mm, and the measurement time is set to 10 seconds. Detection is carried out using a proportional counter (PC) to measure light elements, and using a scintillation counter (SC) to measure heavy elements.

Toner is placed in a dedicated aluminum ring for pressing and is smoothed over; then a measurement sample is obtained in the form of a pellet shaped to a thickness of about 2 mm and a diameter of about 39 mm through pressing for 60 seconds at 20 MPa using a tablet compression molder "BRE-32" (by Maekawa Testing Machine Mfg. Co., Ltd.).

The measurement is carried out under the above conditions, whereupon elements are identified on the basis of the obtained X-ray peak positions; element concentrations are calculated from a count rate (units: cps), which is the number of X-ray photons per unit time. The calculation expression is as follows.

Proportion Fm (atomic %) of polyvalent metal atoms relative to the atoms in toner=(content (kcps) of polyvalent metal atoms in toner)/(content of atoms in toner (kcps))×100

In X-ray fluorescence analysis calibration curves are created, in an X-ray fluorescence analyzer, using oxide particles having known contents of the respective elements; the content of each element in the toner is then worked out on the basis of the respective calibration curve.

Identification of Water-Soluble Polyvalent Metal Salts Contained in Toner

Toner is dissolved in chloroform at 23° C. After addition of water, the whole is thoroughly stirred, and is allowed to stand, followed by liquid separation. Water-soluble polyvalent metal salts contained in the toner can be identified by analyzing the obtained aqueous phase by X-ray fluorescence. The above Fm is analyzed, and solubility measured, on the basis of the identified water-soluble polyvalent metal salt.

Method for Measuring a Strain-Stress Profile at 95° C. of Toner

A precision universal tester "Autograph AG-X" (by Shimadzu Corporation) is used as the measuring device. Herein 0.5 g of toner is placed in a dedicated aluminum ring for pressing and is smoothed over; then a measurement sample is obtained in the form of a pellet shaped to a thickness of about 2 mm and a width of about 6 mm is obtained through pressing for 1 minute at 20 MPa using a tablet compression molder "BRE-32" (by Maekawa Testing Machine Mfg. Co., Ltd.).

A strain-stress profile such as that illustrated in the FIGURE is then obtained through measurement under conditions of tensile rate of 210 mm/min, distance between chucks of 7 mm, and measurement temperature of 95° C. Stress at 200% strain is calculated in the obtained strain-stress profile.

EXAMPLES

The present invention will be explained in further detail hereafter on the basis of examples, but these examples are not meant to limit the present invention in any way. Unless otherwise specified, the language "parts" in the formulations below refers to parts by mass in all instances.

Example 1

Production Example of Amorphous Resin A1

- Polyoxypropylene(2.2)-2,2-bis(4-hydroxyphenyl)propane: 29.7 parts (0.07 moles; 40.0 mol % relative to the total number of moles of polyhydric alcohol)
- Polyoxyethylene(2.2)-2,2-bis(4-hydroxyphenyl)propane: 40.8 parts (0.13 moles; 60.0 mol % relative to the total number of moles of polyhydric alcohol)
- Terephthalic acid: 30.4 parts (0.195 moles; 97.5 mol % relative to the total number of moles of polyvalent carboxylic acid)
- 3,5-bis(carboxymethyl)-3,4,4,5-tetramethylheptanedioic acid (D1): 1.66 parts (0.005 moles; 2.37 mol % relative to the total number of moles of polyvalent carboxylic acid)

The above materials were charged into a reaction vessel equipped with a cooling tube, a stirrer, a nitrogen introduction tube and a thermocouple. Then 1.0 part of tin 2-ethylhexanoate (esterification catalyst) was added as a catalyst, relative to 100 parts of the total amount of monomers. Next, the interior of the flask was replaced with nitrogen gas, after which the temperature was gradually raised while under stirring, and the reaction was conducted for 2.5 hours while under stirring, at a temperature of 200° C. The pressure in the reaction vessel was lowered to 8.3 kPa and was then maintained for 1 hour, followed by cooling down to 180° C., and reversion to atmospheric pressure (first reaction step).

- Trimellitic acid anhydride: 0.04 parts (0.0002 moles; 0.13 mol % relative to the total number of moles of polyvalent carboxylic acid)
- tert-butyl catechol (polymerization inhibitor): 0.1 part Thereafter, the above materials were added, the pressure in the reaction vessel was lowered to 8.3 kPa, and the reaction was conducted for 15 hours while the temperature was maintained at 160° C.; once the softening point of the reactant proved to have reached 95° C. in a measurement according to ASTM D36-86, the temperature was lowered to stop the reaction (second reaction step). Amorphous resin A1 being an amorphous polyester resin was obtained in this manner. The obtained Amorphous resin A1 had a softening point (Tm) of 98° C. and an acid value of 11.3 mgKOH/g.

Production Examples of Amorphous Resins A2 to A5

Amorphous resins A2 to A5 were produced in the same way as in the production example of Amorphous resin A1, but herein the types and amounts of the polyhydric alcohol monomers and the polyvalent carboxylic acid monomers were modified as given in Table 1. Table 1 sets out the physical properties of the obtained amorphous resins.

Production Example of Toner 1

- Amorphous resin A1: 100.0 parts
- Fischer-Tropsch wax (peak temperature of 90° C. of maximum endothermic peak): 5.0 parts
- Carbon black: 10.0 parts
- Magnesium sulfate: 1.5 parts The above materials were mixed using a Henschel mixer (FM-75 model, by Mitsui Miike Chemical Engineering Machinery Co., Ltd.) at a rotational speed of 1500 rpm and for a rotation time of 5 min, followed by kneading using a twin-screw kneader (PCM-30 model, by Ikegai Corp.) set to a temperature of 130° C., with an average dwell time of 60 seconds. The obtained kneaded product was cooled and was coarsely pulverized with a hammer mill, to a size of 1 mm or less, to yield a coarsely pulverized product. The obtained coarsely pulverized product was then finely pulverized using a mechanical pulverizer (T-250, by Turbo Kogyo Co., Ltd.). The resulting product was classified using Faculty (F-300, by Hosokawa Micron Corporation), to yield Toner particle 1. The operating conditions were set to a rotational speed of 11000 rpm of a classification rotor, and a rotational speed of 7200 rpm of a distribution rotor.

- Toner particle 1: 100 parts
- Silica fine particles A: fumed silica surface-treated with hexamethyldisilazane (number-basis median diameter (D50) of 120 nm)): 4 parts
- Small-diameter inorganic fine particles: titanium oxide fine particles surface-treated with isobutyltrimethoxysilane (number-basis median diameter (D50) of 10 nm)): 1 part The above materials were mixed using a Henschel mixer (FM-75 model, by Mitsui Miike Chemical Engineering Machinery Co., Ltd.) at a rotational speed of 1900 rpm and for a rotation time of 10 min, to yield Toner 1 exhibiting negative charging performance.

Production Examples of Toners 2 to 31

Toners 2 to 31 were obtained by performing an operation similar to that of the production example of Toner 1, but herein the type of the Amorphous resin A, the type and addition amount of the water-soluble polyvalent metal salt, and the kneading temperature were modified as given in Table 2. Table 3 sets out the obtained physical properties.

Production Example of Magnetic Carrier 1

- Magnetite 1 (intensity of magnetization 65 $Am^2/kg$ in a 1000/47c (kA/m) magnetic field) having a number-average particle diameter of 0.30 m
- Magnetite 2 (intensity of magnetization 65 $Am^2/kg$ in a 1000/47c (kA/m) magnetic field) having a number-average particle diameter of 0.50 m
- Herein 4.0 parts of a silane compound (3-(2-aminoethylaminopropyl)trimethoxysilane) were added relative to 100 parts of each of the above materials, with high-speed mixing and stirring at 100° C. or above, inside the vessel, to treat the respective fine particles.
- Phenol: 10 mass %
- Formaldehyde solution: 6 mass % (Formaldehyde 40 mass %, methanol 10 mass %, water 50 mass %)

Magnetite 1 treated with the above silane compound: 58 mass %

Magnetite 2 treated with the above silane compound: 26 mass %

Then 100 parts of the above material, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. Next, the resulting product was dried under reduced pressure (5 mmHg or lower) at a temperature of 60° C., to yield a spherical Magnetic carrier 1 of magnetic body-dispersed type. The volume-basis 50% particle diameter (D50) of Magnetic carrier 1 was 34.21 m.

Production Example of Two-Component Developer 1

Herein 92.0 parts of Magnetic carrier 1 and 8.0 parts of Toner 1 were mixed using a V-type mixer (V-20, by Seishin Enterprise Co., Ltd.), to obtain Two-component developer 1.

Production Examples of Two-Component Developers 2 to 31

Two-component developers 2 to 31 were produced by performing the same operation as in the production example of Two-component developer 1, except for the modifications given in Table 4.

Evaluation

Evaluations were performed using the above Two-component developer 1. Two-component developer 1 was introduced into a black developing device, using an image forming apparatus in the form of a modified printer imageRUNNER ADVANCE C5560 for digital commercial printing, by Canon Inc. The apparatus was modified so as to allow freely setting the fixation temperature, process speed, the DC voltage $V_{DC}$ of a developer carrier member, the charging voltage $V_D$ of an electrostatic latent image bearing member, and laser power. To evaluate image output, an FFh image (solid image) having a desired image ratio was outputted, and $V_{DC}$, $V_D$ and laser power were adjusted so that the toner laid-on level on the FFh image, on paper, took on a desired value; the below-described evaluation was then carried out. Herein "FFh" denotes a value obtained by displaying 256 gradations in hexadecimal notation, with 00h as the first of the 256 gradations (white background portion) and FFh as the 256-th of the 256 gradations (solid portion). The evaluation is based on the following evaluation methods; the results are given in Table 5.

Fixing Separability of Thin Paper in a High-Temperature, High-Humidity Environment Using the above-described modified copier, a whole-surface solid image having a toner laid-on level of 1.20 mg/cm$^2$ and provided with a 4.0 mm margin at the upper end was produced without fixing. Next, the above unfixed image was fixed at a process speed of 348 mm/sec using a modified fixing machine. To evaluate fixing separability, the fixation temperature was raised from 100° C. in 5° C. increments, and a temperature 5° C. below the temperature of occurrence of wraparound was taken as the fixing separation temperature. The test environment was set to a high-temperature, high-humidity environment (30° C./80% RH). As the transfer material of the fixed image there was used A4 size Pearl Coat N (73 g/m$^2$) (Mitsubishi Paper Mills Limited). A rating of C or better was deemed as good.

Evaluation Criteria

A: fixing separation temperature of 155° C. or higher

B: fixing separation temperature of 150° C.

C: fixing separation temperature of 145° C.

D: fixing separation temperature of 140° C. or lower

Glossiness

Using the above-described modified copier, a whole-surface solid image having a toner laid-on level of 0.45 mg/cm$^2$ was produced without fixing. Next, the unfixed image was fixed at a process speed of 348 mm/sec and at a fixation temperature of 195° C. in a modified fixing machine. Herein A4 size mondi Color Copy paper (300.0 g/m$^2$) (by Mondi plc.) was used as the transfer material of the fixed image. Among the fixed images, those images in which hot offset did not occur were assigned a gloss value in the form of the average value at three arbitrary points of each image, measured under a condition of a light incidence angle of 60° using a handy gloss value meter Gloss Meter PG-3D (by Nippon Denshoku Industries Co., Ltd.). The evaluation results are given in Table 5. A rating of C or better was deemed as good.

Evaluation Criteria

A: gloss value of 20 or more

B: gloss value from 15 to less than 20

C: gloss value from 10 to less than 15

D: gloss value smaller than 10

Charge Retention Rate in a High-Temperature, High-Humidity Environment

Paper: GFC-081 (81.0 g/m$^2$) (by Canon Marketing Japan Inc.)

laid-on level on paper: 0.35 mg/cm$^2$ (adjusted the basis of the DC voltage $V_{DC}$ of the developer carrier member, the charging voltage $V_D$ of the electrostatic latent image bearing member, and laser power)

Evaluation image: 2 cm×5 cm image disposed at the center of the A4 paper

Fixation test environment: high-temperature, high-humidity environment: temperature 30° C./humidity 80% RH (hereafter "H/H")

Process speed: 377 mm/sec

The triboelectric charge quantity of the toner was calculated by suction-collecting the toner on the electrostatic latent image bearing member using a metallic cylindrical tube and a cylindrical filter. Specifically, the triboelectric charge quantity of the toner on the electrostatic latent image bearing member was measured using a Faraday cage. The Faraday cage herein is a coaxial double cylinder such that the inner cylinder and outer cylinder are insulated from each other. When a charged body having a charge amount of Q is placed in the inner cylinder a state is brought about, on account of electrostatic induction, that is identical to that as if a metal cylinder having a charge amount Q were present. This induced charge amount was measured using an electrometer (Keithley 6517A, by Keithley Instruments Inc.), and the quotient (Q/M) resulting from dividing the charge amount Q (mC) by the toner mass M (kg) in the inner cylinder was taken as the triboelectric charge quantity of the toner.

Triboelectric charge quantity of toner (mC/kg)=Q/M

Firstly, the above evaluation image was formed on the electrostatic latent image bearing member, the rotation of the electrostatic latent image bearing member was stopped prior to transfer of the evaluation image to the intermediate transfer member, and the toner on the electrostatic latent image bearing member was suctioned and collected by a metallic cylindrical tube and cylindrical filter, whereupon "initial Q/M" was measured. Subsequently, the developing device was placed in an evaluation apparatus, in an "H/H" environment, and was allowed to stand, as it was, for 2 weeks; thereafter, there was carried out the same operation as that prior to standing, and the charge amount Q/M (mC/kg) per unit mass of the electrostatic latent image bearing member after standing was measured. Then a retention rate of Q/M per unit mass on the electrostatic latent image bearing member after standing ("Q/M after standing"/"initial Q/M"×100) was calculated relative to 100% as the initial Q/M per unit mass of the electrostatic latent image bearing member, and the calculated retention rate was evaluated in accordance with the criteria below. A rating of C or better was deemed as good.

Evaluation Criteria

A: retention rate 95.0% or higher
B: retention rate from 90.0% to less than 95.0%
C: retention rate from 85.0% to less than 90.0%
D: retention rate lower than 85.0%

Examples 2 to 23 and Comparative Examples 1 to 8

Evaluations were carried out in the same way as in Example 1, but herein Two-component developers 2 to 23 were used as Examples 2 to 23, respectively, and Two-component developers 24 to 31 were used as Comparative examples 1 to 8, respectively. The evaluation results are given in Table 5.

TABLE 1

| | Polyhydric alcohol component Used in first reaction step Monomer | | | Polyhydric alcohol component Used in first reaction step Monomer | | | Polyvalent carboxylic acid component Used in first reaction step Monomer | | Monomer | | Used in second reaction step Monomer | | Properties | | | |
|---|---|---|---|---|---|---|---|---|---|---|---|---|---|---|---|---|
| Amorphous resin No. | Type | Number of added moles | mol % | Type | Number of added moles | mol % | Type | mol % | Type | mol % | Type | mol % | Mw | Tg [° C.] | Tm [° C.] | Acid value |
| A1 | BPA-PO | 2.2 | 40 | BPA-EO | 2.2 | 60 | TPA | 97.50 | D1 | 2.37 | TMA anhydride | 0.13 | 4900 | 62 | 98 | 11.3 |
| A2 | BPA-PO | 2.2 | 40 | BPA-EO | 2.2 | 60 | TPA | 99.90 | — | — | TMA anhydride | 0.10 | 5100 | 60 | 98 | 15.0 |
| A3 | BPA-PO | 2.2 | 40 | BPA-EO | 2.2 | 60 | TPA | 97.55 | D2 | 2.40 | TMA anhydride | 0.05 | 4800 | 58 | 100 | 1.0 |
| A4 | BPA-PO | 2.2 | 40 | BPA-EO | 2.2 | 60 | TPA | 90.10 | D2 | 2.40 | TMA anhydride | 7.50 | 4950 | 65 | 104 | 30.0 |
| A5 | BPA-PO | 2.2 | 40 | BPA-EO | 2.2 | 60 | TPA | 89.85 | D2 | 2.40 | TMA anhydride | 7.75 | 4950 | 65 | 104 | 31.0 |

The units of acid value in the table are mgKOH/g.
The abbreviations in the table are as follows.
BPA-PO: bisphenol A propylene oxide adduct
BPA-EO: bisphenol A ethylene oxide adduct
TPA: terephthalic acid
D1: 3,5-bis(carboxymethyl)-3,4,4,5-tetramethylheptanedioic acid
D2: 1,1,6,6-hexanetetracarboxylic acid
TMA anhydride: trimellitic acid anhydride

TABLE 2

| | Formulation | | | | | | Production conditions | |
|---|---|---|---|---|---|---|---|---|
| Toner No. | Amorphous resin No. | Acid value | Number of parts | Water-soluble polyvalent metal salt | Solubility | Number of parts | Kneading temperature (° C.) | Dwell time (s) |
| 1 | A1 | 11.3 | 100.00 | Magnesium sulfate | 71 | 1.50 | 130 | 60 |
| 2 | A1 | 11.3 | 100.00 | Magnesium sulfate | 71 | 1.50 | 120 | 60 |
| 3 | A1 | 11.3 | 100.00 | Magnesium sulfate | 71 | 1.50 | 115 | 60 |
| 4 | A1 | 11.3 | 100.00 | Magnesium sulfate | 71 | 1.50 | 140 | 60 |
| 5 | A1 | 11.3 | 100.00 | Magnesium sulfate | 71 | 1.50 | 145 | 60 |
| 6 | A1 | 11.3 | 100.00 | Magnesium sulfate | 71 | 0.38 | 130 | 60 |
| 7 | A1 | 11.3 | 100.00 | Magnesium sulfate | 71 | 0.34 | 130 | 60 |
| 8 | A1 | 11.3 | 100.00 | Magnesium sulfate | 71 | 18.80 | 130 | 60 |
| 9 | A1 | 11.3 | 100.00 | Magnesium sulfate | 71 | 18.83 | 130 | 60 |
| 10 | A1 | 11.3 | 100.00 | Magnesium sulfate | 71 | 3.00 | 130 | 80 |
| 11 | A1 | 11.3 | 100.00 | Magnesium sulfate | 71 | 3.00 | 130 | 40 |
| 12 | A1 | 11.3 | 100.00 | Magnesium sulfate | 71 | 1.50 | 110 | 80 |
| 13 | A1 | 11.3 | 100.00 | Magnesium sulfate | 71 | 1.50 | 110 | 70 |
| 14 | A1 | 11.3 | 100.00 | Aluminum chloride | 45 | 1.50 | 130 | 60 |

TABLE 2-continued

| | Formulation | | | | | | Production conditions | |
|---|---|---|---|---|---|---|---|---|
| Toner No. | Amorphous resin No. | Acid value | Number of parts | Water-soluble polyvalent metal salt | Solubility | Number of parts | Kneading temperature (° C.) | Dwell time (s) |
| 15 | A1 | 11.3 | 100.00 | Zinc nitrate | 200 | 1.50 | 130 | 60 |
| 16 | A1 | 11.3 | 100.00 | Calcium chloride | 75 | 1.50 | 130 | 60 |
| 17 | A1 | 11.3 | 100.00 | Magnesium chloride | 54 | 1.50 | 130 | 60 |
| 18 | A1 | 11.3 | 100.00 | Magnesium nitrate | 55 | 1.50 | 130 | 60 |
| 19 | A1 | 11.3 | 100.00 | Zinc sulfate | 54 | 1.50 | 130 | 60 |
| 20 | A1 | 11.3 | 100.00 | Iron sulfate | 87 | 1.50 | 130 | 60 |
| 21 | A2 | 15.0 | 100.00 | Magnesium sulfate | 71 | 1.50 | 130 | 60 |
| 22 | A3 | 1.0 | 100.00 | Magnesium sulfate | 71 | 1.50 | 130 | 60 |
| 23 | A4 | 30.0 | 100.00 | Magnesium sulfate | 71 | 1.50 | 130 | 60 |
| 24 | A1 | 11.3 | 100.00 | Magnesium sulfate | 71 | 1.50 | 130 | 90 |
| 25 | A1 | 11.3 | 100.00 | Magnesium sulfate | 71 | 1.50 | 130 | 30 |
| 26 | A1 | 11.3 | 100.00 | Magnesium sulfate | 71 | 1.50 | 130 | 45 |
| 27 | A1 | 11.3 | 100.00 | Calcium sulfate | 1 | 1.50 | 130 | 60 |
| 28 | A1 | 11.3 | 100.00 | Zinc chloride | 420 | 1.50 | 130 | 60 |
| 29 | A1 | 11.3 | 100.00 | Magnesium caibonate | 0 | 1.50 | 130 | 60 |
| 30 | A1 | 11.3 | 100.00 | Barium chloride | 38 | 1.50 | 130 | 60 |
| 31 | A5 | 31.0 | 100.00 | Magnesium sulfate | 71 | 1.50 | 130 | 60 |

In the table, the units of acid value are mgKOH/g, and the solubility denotes g/100 mL solubility in water at 25° C.

TABLE 3

| | Properties | | | | | |
|---|---|---|---|---|---|---|
| Toner No. | Total area of domains with surface area from 0.002 $\mu m^2$ to 0.050 $\mu m^2$/total area of domains | At | Fm | At/Fm | Area % | Strain-stress |
| 1 | 100 | 0.4 | 5.7 | 0.07 | 0.40 | 25 |
| 2 | 100 | 0.4 | 5.7 | 0.07 | 0.40 | 20 |
| 3 | 100 | 0.4 | 5.7 | 0.07 | 0.40 | 19 |
| 4 | 100 | 0.4 | 5.7 | 0.07 | 0.40 | 40 |
| 5 | 100 | 0.4 | 5.7 | 0.07 | 0.40 | 41 |
| 6 | 100 | 0.1 | 1.4 | 0.07 | 0.10 | 25 |
| 7 | 100 | 0.1 | 1.3 | 0.07 | 0.09 | 25 |
| 8 | 100 | 5.0 | 71.4 | 0.07 | 5.00 | 25 |
| 9 | 100 | 5.0 | 71.6 | 0.07 | 5.01 | 25 |
| 10 | 90 | 0.2 | 11.4 | 0.02 | 0.18 | 25 |
| 11 | 90 | 1.1 | 11.4 | 0.10 | 0.99 | 25 |
| 12 | 80 | 0.4 | 5.7 | 0.07 | 0.32 | 25 |
| 13 | 90 | 0.4 | 5.7 | 0.07 | 0.36 | 25 |
| 14 | 100 | 0.4 | 5.7 | 0.07 | 0.40 | 25 |
| 15 | 100 | 0.4 | 5.7 | 0.07 | 0.40 | 25 |
| 16 | 100 | 0.4 | 5.7 | 0.07 | 0.40 | 25 |
| 17 | 100 | 0.4 | 5.7 | 0.07 | 0.40 | 25 |
| 18 | 100 | 0.4 | 5.7 | 0.07 | 0.40 | 25 |
| 19 | 100 | 0.4 | 5.7 | 0.07 | 0.40 | 25 |
| 20 | 100 | 0.4 | 5.7 | 0.07 | 0.40 | 25 |
| 21 | 100 | 0.4 | 5.7 | 0.07 | 0.40 | 25 |
| 22 | 100 | 0.4 | 5.7 | 0.07 | 0.40 | 25 |
| 23 | 100 | 0.4 | 5.7 | 0.07 | 0.40 | 25 |
| 24 | 100 | 0.1 | 5.7 | 0.01 | 0.10 | 25 |
| 25 | 100 | 0.6 | 5.7 | 0.11 | 0.60 | 25 |
| 26 | 79 | 0.4 | 5.7 | 0.07 | 0.32 | 25 |
| 27 | 100 | 0.4 | 5.7 | 0.07 | 0.40 | 25 |
| 28 | 100 | 0.4 | 5.7 | 0.07 | 0.40 | 25 |
| 29 | 100 | 0.4 | 5.7 | 0.07 | 0.40 | 25 |
| 30 | 100 | 0.4 | 5.7 | 0.07 | 0.40 | 25 |
| 31 | 100 | 0.4 | 5.7 | 0.07 | 0.40 | 25 |

In the table, At denotes the proportion (area %) of the total area of domains derived from a water-soluble polyvalent metal salt relative to the area of a cross section of the toner particle, and Fm denotes the proportion (atomic %) of the atom of polyvalent metal relative to the atoms in the toner as detected by X-ray fluorescence analysis. The term area % is the proportion of the surface area of domains derived from a water-soluble polyvalent metal salt and having a surface area from 0.002 $\mu m^2$ to 0.050 $\mu m^2$, relative to the area of the cross section of the toner particle. The term strain-stress is the stress (kPa) at 200% strain in a strain-stress profile of the toner at 95° C.

TABLE 4

| | Two-component developer | Magnetic carrier | Toner |
|---|---|---|---|
| Example 1 | 1 | 1 | 1 |
| Example 2 | 2 | 1 | 2 |
| Example 3 | 3 | 1 | 3 |
| Example 4 | 4 | 1 | 4 |
| Example 5 | 5 | 1 | 5 |
| Example 6 | 6 | 1 | 6 |
| Example 7 | 7 | 1 | 7 |
| Example 8 | 8 | 1 | 8 |
| Example 9 | 9 | 1 | 9 |
| Example 10 | 10 | 1 | 10 |
| Example 11 | 11 | 1 | 11 |
| Example 12 | 12 | 1 | 12 |
| Example 13 | 13 | 1 | 13 |
| Example 14 | 14 | 1 | 14 |
| Example 15 | 15 | 1 | 15 |
| Example 16 | 16 | 1 | 16 |
| Example 17 | 17 | 1 | 17 |
| Example 18 | 18 | 1 | 18 |
| Example 19 | 19 | 1 | 19 |
| Example 20 | 20 | 1 | 20 |
| Example 21 | 21 | 1 | 21 |
| Example 22 | 22 | 1 | 22 |
| Example 23 | 23 | 1 | 23 |
| Comparative example 1 | 24 | 1 | 24 |
| Comparative example 2 | 25 | 1 | 25 |
| Comparative example 3 | 26 | 1 | 26 |
| Comparative example 4 | 27 | 1 | 27 |
| Comparative example 5 | 28 | 1 | 28 |

TABLE 4-continued

| | Two-component developer | Magnetic carrier | Toner |
|---|---|---|---|
| Comparative example 6 | 29 | 1 | 29 |
| Comparative example 7 | 30 | 1 | 30 |
| Comparative example 8 | 31 | 1 | 31 |

TABLE 5

| Example | Fixing separation temperature (° C.) | | Gloss [—] | | Charge retention (%) | | | |
|---|---|---|---|---|---|---|---|---|
| No. | | Fixing separation temper-ature | | Gloss | | Ini-tial Q/M | Post-endur-ance Q/M | Q/M reten-tion |
| 1 | A | 165 | A | 23 | A | 29 | 29 | 100.0% |
| 2 | B | 150 | A | 23 | A | 29 | 29 | 100.0% |
| 3 | C | 145 | A | 23 | A | 29 | 29 | 100.0% |
| 4 | A | 165 | B | 16 | A | 29 | 29 | 100.0% |
| 5 | A | 165 | C | 14 | A | 29 | 29 | 100.0% |
| 6 | B | 150 | A | 23 | A | 29 | 29 | 100.0% |
| 7 | C | 145 | A | 23 | A | 29 | 29 | 100.0% |
| 8 | A | 165 | B | 16 | A | 29 | 29 | 100.0% |
| 9 | A | 165 | C | 14 | A | 29 | 29 | 100.0% |
| 10 | A | 165 | C | 12 | A | 29 | 29 | 100.0% |
| 11 | C | 145 | A | 23 | A | 29 | 29 | 100.0% |
| 12 | C | 145 | A | 23 | A | 29 | 29 | 100.0% |
| 13 | B | 155 | A | 23 | A | 29 | 29 | 100.0% |
| 14 | B | 150 | A | 23 | A | 29 | 29 | 100.0% |
| 15 | A | 165 | A | 23 | B | 29 | 26 | 90.7% |
| 16 | A | 165 | A | 23 | A | 29 | 29 | 100.0% |
| 17 | A | 165 | A | 23 | A | 29 | 29 | 100.0% |
| 18 | A | 165 | A | 23 | A | 29 | 29 | 100.0% |
| 19 | A | 165 | A | 23 | A | 29 | 29 | 100.0% |
| 20 | A | 165 | A | 23 | A | 29 | 29 | 100.0% |
| 21 | A | 160 | A | 23 | A | 29 | 29 | 100.0% |
| 22 | B | 150 | A | 23 | A | 29 | 29 | 100.0% |
| 23 | A | 165 | A | 23 | C | 29 | 25 | 86.2% |
| C.E. 1 | A | 165 | D | 9 | A | 29 | 29 | 100.0% |
| C.E. 2 | D | 135 | A | 23 | A | 29 | 29 | 100.0% |
| C.E. 3 | D | 135 | A | 23 | A | 29 | 29 | 100.0% |
| C.E. 4 | D | 135 | A | 23 | A | 29 | 29 | 100.0% |
| C.E. 5 | A | 165 | A | 23 | D | 29 | 22 | 75.9% |
| C.E. 6 | D | 135 | A | 23 | A | 29 | 29 | 100.0% |
| C.E. 7 | D | 135 | A | 23 | A | 29 | 29 | 100.0% |
| C.E. 8 | A | 165 | A | 23 | D | 29 | 24 | 82.8% |

In the table "C.E." indicates "Comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-080709, filed May 12, 2021, which is hereby incorporated by reference herein in its entirety.

What is claimed is:

1. A toner comprising a toner particle, the toner particle comprising a binder resin, and a water-soluble polyvalent metal salt, wherein a main component of the binder resin is a polyester resin;

an acid value of the polyester resin is 1.0 mgKOH/g to 30.0 mgKOH/g;

a polyvalent metal of the water-soluble polyvalent metal salt is at least one metal selected from the group consisting of Mg, Ca, Al, Fe and Zn;

the water-soluble polyvalent metal salt is a chloride, nitrate or sulfate of the polyvalent metal;

the water-soluble polyvalent metal salt has a solubility in water at 25° C. of 30 g/100 mL to 200 g/100 mL;

in a cross-sectional observation of the toner particle using a transmission electron microscope, a proportion of an area of domains derived from the water-soluble polyvalent metal salt and having an area of 0.002 $\mu m^2$ to 0.050 $\mu m^2$, relative to a total area of the domains derived from the water-soluble polyvalent metal salt, is 80 area % to 100 area %; and Expression (1) below is satisfied, where At (area %) is the proportion of the total area of the domains derived from the water-soluble polyvalent metal salt relative to an area of a cross section of the toner particle, and Fm (atomic %) is a proportion of an atom of the polyvalent metal relative to atoms in the toner as detected by X-ray fluorescence analysis $$0.02 \leq At/Fm \leq 0.10 \quad (1).$$

2. The toner according to claim 1, wherein in a cross-sectional observation of the toner particle using the transmission electron microscope, a proportion of the area of domains derived from the water-soluble polyvalent metal salt and having the area of 0.002 $\mu m^2$ to 0.050 $\mu m^2$, relative to an area of the toner particle, is from 0.10 area % to 5.00 area %.

3. The toner according to claim 1, wherein in a strain-stress profile of the toner at 95° C., stress at 200% strain is from 20 kPa to 40 kPa.

4. The toner according to claim 1, wherein the polyvalent metal of the water-soluble polyvalent metal salt is at least one selected from the group consisting of Mg, Ca and Al.

5. The toner according to claim 1, wherein the water-soluble polyvalent metal salt is a sulfate of the polyvalent metal.

6. The toner according to claim 1, wherein the acid value of the polyester resin is from 5.0 mgKOH/g to 25.0 mgKOH/g.

7. The toner according to claim 1, wherein the proportion of the area of the domains derived from the water-soluble polyvalent metal salt and having the area of 0.002 $\mu m^2$ to 0.050 $\mu m^2$, relative to the total area of the domains derived from the water-soluble polyvalent metal salt, is 90 area % to 100 area %.

* * * * *